United States Patent
Klein

(10) Patent No.: US 9,384,034 B2
(45) Date of Patent: Jul. 5, 2016

(54) DETECTING OPERATION OF A VIRTUAL MACHINE

(71) Applicant: International Business Machines Corporation, Armonk, NY (US)

(72) Inventor: Amit Klein, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 14/228,756

(22) Filed: Mar. 28, 2014

(65) Prior Publication Data

US 2015/0277950 A1 Oct. 1, 2015

(51) Int. Cl.
G06F 9/455 (2006.01)

(52) U.S. Cl.
CPC .. *G06F 9/45558* (2013.01); *G06F 2009/45591* (2013.01)

(58) Field of Classification Search
CPC ................................................. G06F 9/45533
See application file for complete search history.

(56) References Cited

U.S. PATENT DOCUMENTS

| 2003/0028742 A1* | 2/2003 | Hameau et al. ............... 711/172 |
| 2009/0307689 A1* | 12/2009 | Sudhakar ........................ 718/1 |
| 2010/0107257 A1* | 4/2010 | Ollmann ........................ 726/24 |
| 2013/0263114 A1* | 10/2013 | Watkins et al. .................. 718/1 |

OTHER PUBLICATIONS

Jeremiah Grossman; "Web pages Detecting Virtualized Browers and other tricks"; Aug. 18, 2009; Printed Mar. 12, 2014; <http://jeremiahgrossman.blogspot.co.il/2009/08/web-pages-detecting-virualized.html>.

Amit Klein; Detecting virtualization over the web with IE9 (platform preview) and Semi-permanent computer fingerprinting and user tracking in IE9 (platform preview); Trusteer; Jun.-Jul. 2010; Released to public: Dec. 2, 2010.

"Detect monitor maximum (native) resolution"; Aug. 6, 2011; Printed Mar. 12, 2014; <http://www.autoitscript.com/forum/topic/131618-detect-monitor-maximum-native-resolution/>.

* cited by examiner

*Primary Examiner* — Philip Wang
(74) *Attorney, Agent, or Firm* — Steven F. McDaniel

(57) ABSTRACT

Detecting the operation of a virtual machine by identifying seed candidates from sets of random numbers generated at a computer, where each of the sets includes multiple random numbers, identifying candidate performance counter frequencies from the seed candidates and from timing information associated with the sets of random numbers, and determining that the computer is operating as a virtual machine if any of the candidate performance counter frequencies is consistent with a predefined virtual machine performance counter frequency.

20 Claims, 8 Drawing Sheets

```
#include <stdlib.h>
include <stdio.h> define c3  15731L
define c2  789221L
define c1  1376312589L define kRandomPureMax 0x7FFFFFFFL int postlfsr(int v)
{
        int iSeed=v*71;
        iSeed = ((iSeed << 13) ^ iSeed) - (iSeed >> 21);

/* Next, use a third order odd polynomial, better than linear. */
        int iResult = (iSeed*(iSeed*iSeed*c3 + c2) + c1) & kRandomPureMax;

/* DJ14dec94 -- The above wonderful expression always returns odd
           / numbers, and this is easy to prove.  So we add the seed back to
           / the result which again randomizes bit zero. */
        iResult += iSeed;

/* DJ17nov95 -- The above always returns values that are NEVER divisible
           / evenly by four, so do additional hashing. */
        iResult = ((iResult << 13) ^ iResult) - (iResult >> 21);

return iResult & kRandomPureMax;
} int shifter(int iResult)
{
      iResult = ((iResult << 13) ^ iResult) - (iResult >> 21);
      return iResult;
} int poly(int iSeed)
{
      int iResult = (iSeed*(iSeed*iSeed*c3 + c2) + c1) & kRandomPureMax;

/* DJ14dec94 -- The above wonderful expression always returns odd
           / numbers, and this is easy to prove.  So we add the seed back to
           / the result which again randomizes bit zero. */
      iResult += iSeed;
      return iResult;
}
```

Fig. 2A

```
int rev_shifter(int v, int parent[128])
{
        int len=0;
        for (int bit31=0;bit31<2;bit31++)
        {
                for (int carry=0;carry<2;carry++)
                {
                        int clean_xor=(v&0xFFFFF800)+((bit31<<31)>>21)+(carry<<11);

for (int bits0_4=0;bits0_4<0x20;bits0_4++)
                        {
                                int bits21_25=(bits0_4-v)&0x1F;
                                int bits13_17=((clean_xor>>13)^bits0_4)&0x1F;
                                int bits26_30=((clean_xor>>26)^bits13_17)&0x1F;
                                int sub=bits21_25+(bits26_30<<5)+((bit31<<31)>>21);
                                int pre_v=v+sub;

pre_v^=(pre_v&0x1FFF)<<13;
                                pre_v^=(pre_v&(0x1FFF<<13))<<13;

if (shifter(pre_v)==v)
                                {
                                        int i;
                                        for (i=0;i<len;i++)
                                        {
                                                if (parent[i]==pre_v)
                                                {
                                                        break;
                                                }
                                        }
                                        if (i==len)
                                        {
                                                parent[len]=pre_v;
                                                len++;
                                        }
                                }
                        }
                }
        }
        return len;
}
```

Fig. 2B

```
int candidates[1000];
int n=-1;
int exe=-1;
void collect(int y,int seed,int b,int p[],int* n)
{
        if (b==32)
        {
                p[*n]=seed;
                (*n)++;
                return;
        }
        int mask=(1<<(b+1))-1;
        if (b==31) // 1<<32 == 1 (I was expecting 0...) so need to fix it.
        {
                mask=0xFFFFFFFF;
        }
        if ((poly(seed)&mask)==(y&mask))
        {
                collect(y,seed,b+1,p,n);
        }
        if ((poly(seed|(1<<b))&mask)==(y&mask))
        {
                collect(y,seed|(1<<b),b+1,p,n);
        }
        return;
}
int rev_poly(int v, int p[])
{
        int n=0;
        collect(v,0,0,p,&n);
        return n;
}
```

Fig. 2C

```
int rev_postlfsr(int v,int p[])
{
        int l=0;
        for (int msb=0;msb<2;msb++)
        {
                int v1=v|(msb<<31);
                int p1[128];
                int l1=rev_shifter(v1,p1);
                for (int i=0;i<l1;i++)
                {
                        int p2[1000];
                        int l2=rev_poly(p1[i],p2);
                        for (int j=0;j<l2;j++)
                        {
                                int p3[128];
                                int l3=rev_shifter(p2[j],p3);
                                for (int k=0;k<l3;k++)
                                {
                                        unsigned int pre=3811027319U*(unsigned int)p3[k];
                                        if ((pre&0x80000000)==0)
                                        {
                                                //printf("Bingo: pre=%08x\n",pre);
                                                p[l]=pre;
                                                l++;
                                        }
                                }
                        }
                }
        }
        return l;
} int next(int v)
{
        if (v&1)
        {
                return (v>>1)^0x48000000;
        }
        else
        {
                return v>>1;
        }
}
```

Fig. 2D

```
void get_seeds(int first, int second, unsigned int seed[2])
{
        int p[1000];
        int l=rev_postlfsr(first,p);
        for (int i=0;i<l;i++)
        {
                if (postlfsr(next(p[i]))==second)
                {
                        int highbit=(p[i]>>31)&1;
                        seed[0]=((p[i]^(highbit?0:0x48000000))<<1)|highbit;
                        seed[1]=seed[0]^0x90000001;
                        return;
                }
        }
}
```

Fig. 2E

DETECTING OPERATION OF A VIRTUAL MACHINE

FIELD OF THE INVENTION

The present invention relates generally to identification of devices accessing a computer via a network communication, and more particularly, to detection of a virtual machine accessing a computer.

BACKGROUND OF THE INVENTION

A virtual machine (VM) is a software-based emulation of a computer. A virtual machine typically emulates a physical computing environment, but requests for CPU, memory, hard disk, network and other hardware resources are managed by a virtualization layer which translates these requests to the underlying physical hardware. A virtual machine acts and presents itself, e.g., to devices in communication with the virtual machine, as if it were a physical computer.

SUMMARY

In one aspect of the invention a method is provided for detecting the operation of a virtual machine by identifying seed candidates from sets of random numbers generated at a computer, where each of the sets includes multiple random numbers; identifying candidate performance counter frequencies from the seed candidates and from timing information associated with the sets of random numbers; and determining whether any of the candidate performance counter frequencies is consistent with a predefined virtual machine performance counter frequency.

In other aspects of the invention systems and computer program products embodying the invention are provided.

BRIEF DESCRIPTION OF THE SEVERAL VIEWS OF THE DRAWINGS

Aspects of the invention will be understood and appreciated more fully from the following detailed description taken in conjunction with the appended drawings in which:

FIGS. 2A-2E, taken together, is an exemplary C++ source code snippet of a method for identifying seed candidates of random numbers, operative in accordance with an embodiment of the invention;

DETAILED DESCRIPTION

Figure 1:
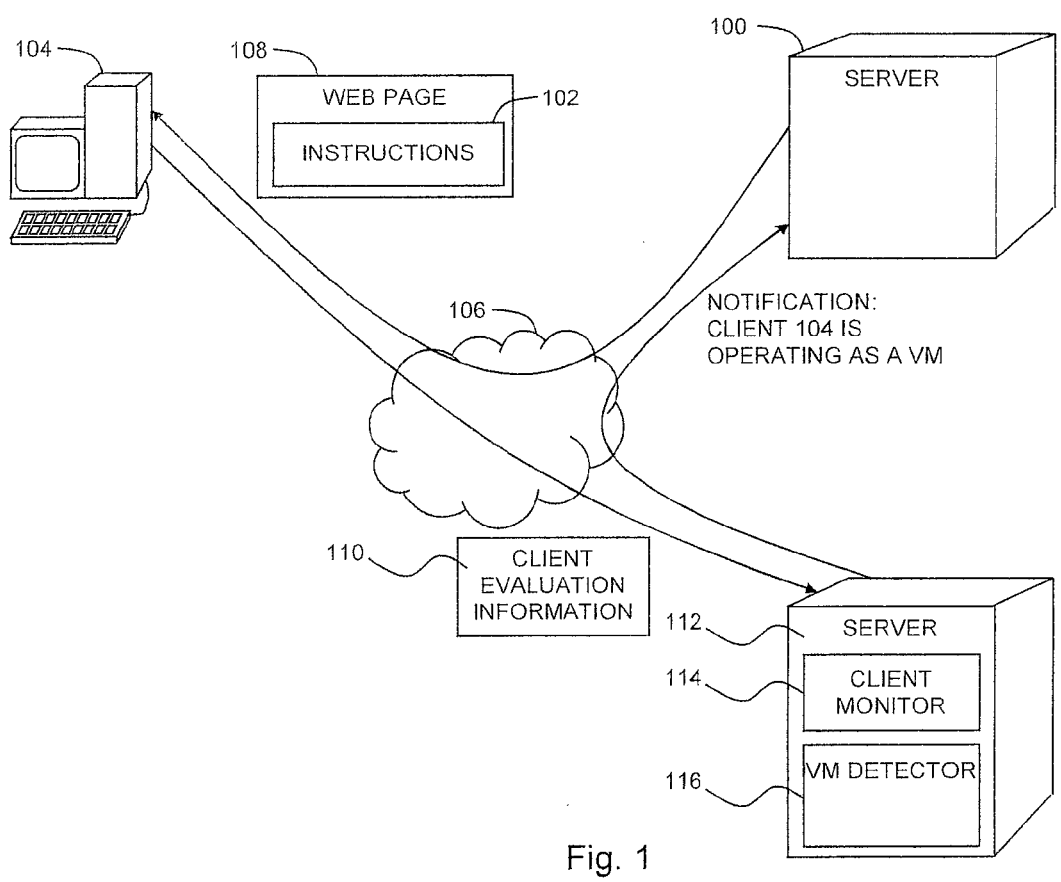
FIG. 1 is a simplified conceptual illustration of a system for detecting the operation of a virtual machine, constructed and operative in accordance with an embodiment of the invention.

Embodiments of the present invention recognize that fraudulent use of computer network-based applications, such as online banking applications, frequently involves a perpetrator performing a transaction using a virtual machine (VM) so as to defeat security controls that rely on identifying a computer through information that is stored on the computer, such as through the use of cookies or browser cache entries. This is because a VM is often discarded after a single use by perpetrators of fraudulent transactions. Embodiments of the present invention identify performance measurements of devices in communication with a computer, and make determinations based on the performance measurements as to whether a particular device in communication with the computer is a VM. Implementation of embodiments of the invention may take a variety forms, and exemplary implementation details are discussed subsequently with reference to the Figures.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a simplified conceptual illustration of a system for detecting the operation of a virtual machine, constructed and operative in accordance with an embodiment of the invention. In the system of FIG. 1, a computer 100, hereinafter referred to as server 100, is configured to provide executable computer software instructions 102, hereinafter referred to as instructions 102, to a computer 104, hereinafter referred to as client 104, such as via a computer network 106, such as the Internet. Server 100 preferably provides instructions 102 embedded within a web page 108 that server 100 provides to client 104 as part of a financial transaction, where client 104 is configured to execute instructions 102 in accordance with conventional techniques.

Instructions 102 are configured to produce two sets of random numbers by calling a random number generator, where each set of random numbers includes two random numbers, and where each set of random numbers is produced at two different times, such as separated by two seconds or more. Thus, for example, instructions 102 may be configured to play two separate Adobe Flash™ movie instances, which may or may not be instances of the same movie, where each instance is configured to make two consecutive calls to the Adobe Flash™ Math.random( ) API function in order to generate two random numbers. Instructions 102 are also configured to record timing information associated with the sets of random numbers, such as by recording a timestamp associated with each set, such as when the first random number in each set is generated or when each Adobe Flash™ movie instance is executed, and/or by recording the difference between the timestamps, preferably where the timing information to the nearest millisecond or smaller unit of time measurement.

Instructions 102 are also configured to report client evaluation information 110, such as to a server 112, or alternatively to server 100, where in the latter case references to server 112 herein below may be understood as referring to server 100. Instructions 102 are configured to compile client evaluation information 110 using the two sets of random numbers and the timing information associated with the sets, such as where client evaluation information 110 includes the two sets of random numbers and their timestamps and/or the difference between the timestamps, and/or by performing any of the operations described herein below regarding the two sets of random numbers and their timing information and including the results of these operations in client evaluation information 110.

A client monitor 114, which may be hosted by server 112, receives client evaluation information 110 reported by client 104. Client monitor 114 is configured to identify, using conventional techniques, seed candidates for each set of random numbers in client evaluation information 110, where a seed candidate represents a seed value used by the random number generator that created the random numbers. One method for identifying the seed candidates in any of the sets of two random numbers is shown in FIGS. 2A-2E, taken together, where the first two arguments of the function get_seeds are two integers representing the two random numbers in the set, where the integers are first created, by instructions 102 or client monitor 104, by multiplying the floating point random number by 231, and where the third argument of the function get_seeds is a two-cell integer array that will receive the two possible seed values.

Client monitor 114 is also preferably configured to identify, using conventional techniques, candidate performance counter frequencies from the seed candidates and the difference between the timestamps associated with the two sets of random numbers. For example, given the following random numbers and timestamps generated by a client computer of:

Set 1:
First random value: 0.5389754404313862 (*2^31=1157440945)
Second random value: 0.16483650915324688 (*2^31=353983708)
Timestamp (in milliseconds): 1367412388593

Set 2:
First random value: 0.2321327575482428 (*2^31=498501301)
Second random value: 0.509417686611414 (*2^31=1093966152)
Timestamp (in milliseconds): 1367412396625

The two seed candidates for Set 1 are 2594857326 and 178938223, the two seed candidates for Set 2 are 2623551178 and 207632075, and the difference between the timestamps is 8.032 seconds. Each seed candidate in Set 1 is then paired with each seed candidate in Set 2, creating four pairs, the Set 1 seed candidate in each pair is then subtracted from its paired Set 2 seed candidate, modulo 2^32, and the result is then divided by the difference between the timestamps to create four candidate performance counter frequencies as follows:

| Set 1 seed candidate | Set 2 seed candidate | 2nd-1st mod 2^32 | divided by 8.032 |
|---|---|---|---|
| 2594857326 | 2623551178 | 28693852 | 3572441.733068 |
| 2594857326 | 207632075 | 1907742045 | 237517684.885458 |
| 178938223 | 2623551178 | 2444612955 | 304359182.644422 |
| 178938223 | 207632075 | 28693852 | 3572441.733068 |

The four candidate performance counter frequencies are 3572441.733068, 237517684.885458, 304359182.644422, and 3572441.733068.

A VM detector 116, which may also be hosted by server 112, is configured to determine that client 104 is operating as a VM by determining that at least one of the candidate performance counter frequencies, provided by client monitor 114 to VM detector 116, is consistent with a predefined performance counter frequency that is associated with virtual machines, such as by being equal to the predefined performance counter frequency, or being approximately equal to the predefined performance counter frequency but within a predefined variance. For example, when recording timestamps using the Adobe Flash™ Date::getTime( ) function, the sampling error associated with a single timestamp can be up to one Microsoft Windows® clock tick, which is typically 15.625 ms, such that the maximum error due to subtracting two consecutive timestamps is ±32 ms. This sampling error may then be used to establish a range for the predefined performance counter frequency, where VM detector 116 may determine that client 104 is operating as a VM by determining that at least one of the candidate performance counter frequencies falls within this range.

For example, research has shown that a client computer running the Microsoft Windows® 7 or 8 operating systems in a virtual machine exhibits performance counter frequencies of 3579545 Hz associated with the Power Management (PM) timer or 14318180 Hz associated with the High Precision Event Timer (HPET), whereas a client computer running a non-virtualized instance of the Microsoft Windows® 7 or 8 operating system exhibits a Time Stamp Counter (TSC)-based performance counter frequency that is approximately the CPU's clock speed divided by 1024. Thus, for example, Microsoft Windows® 7 running on a physical machine whose clock speed is 2.2 GHz will use a TSC-based high performance resolution counter rated at approximately 2.2 GHz/1024=2148437 Hz. In the example above, the first and fourth candidate performance counter frequencies, which are identical, of 3572441.733068 is approximately equal to the PM timer clock frequency of 3579545 Hz, for which a range of 3558265 Hz to 3586731 Hz is established based on the sampling error described above.

VM detector 116 is also preferably configured to provide a notification, such as to server 100, identifying client 104 as operating as a VM, such as by providing in the notification the network address of client 104, a digital token that identifies browser software at client 104, or any other known means for identifying client 104. Thus, for example, where server 100 provides instructions 102 within web page 108 to client 104 in connection with a financial transaction, such as a banking transaction, and VM detector 116 determines that client 104 is operating as a VM, VM detector 116 preferably notifies server 100 that client 104 is operating as a VM, whereupon server 100 may subject the transaction to additional security measures, such as subjecting the transaction to further scrutiny, curtailing the transaction, or preventing the transaction from being completed.

Figure 3:
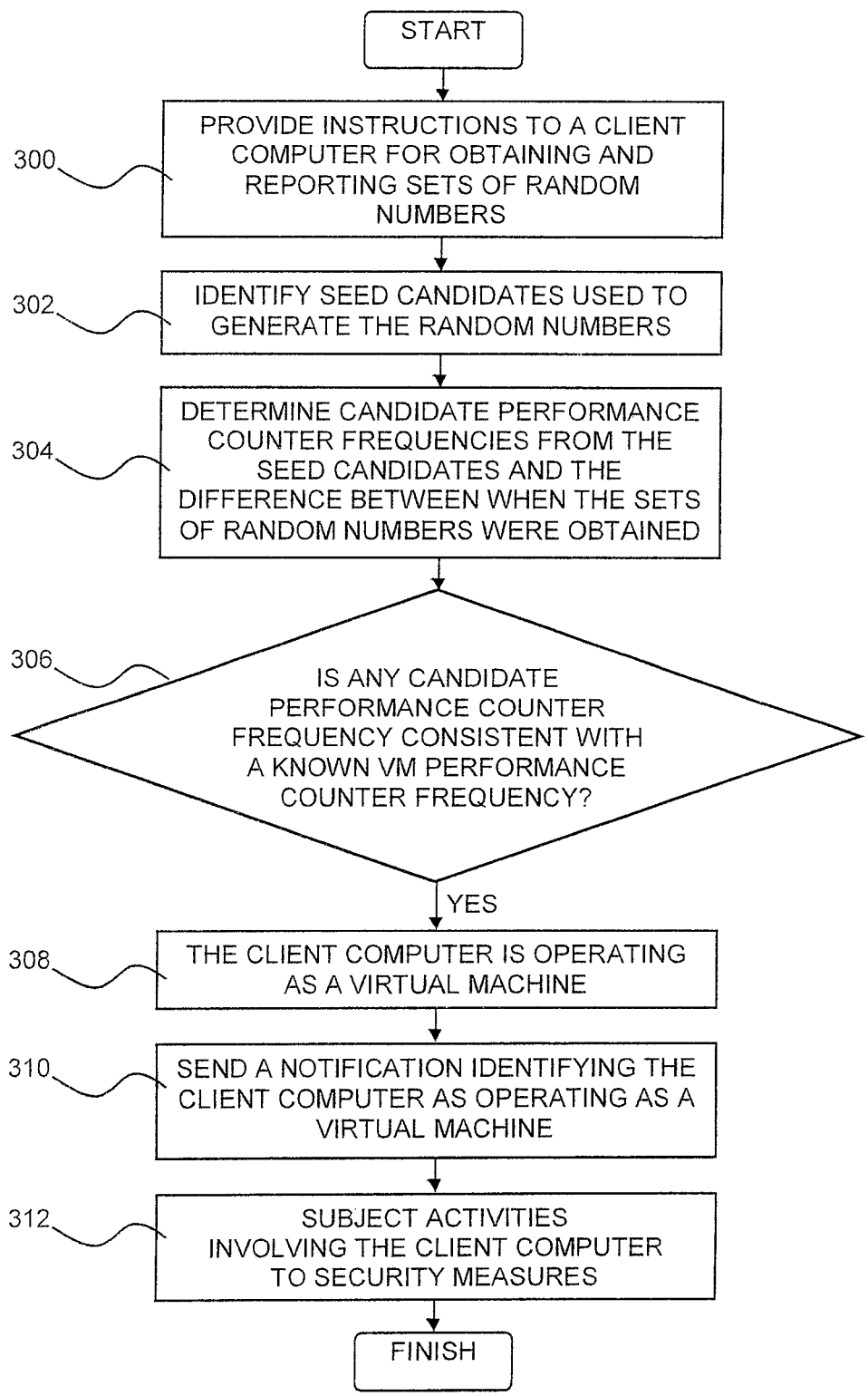
FIG. 3 is a simplified flowchart illustration of an exemplary method of operation of the system of FIG. 1, operative in accordance with an embodiment of the invention.

Reference is now made to FIG. 3 which is a simplified flowchart illustration of an exemplary method of operation of the system of FIG. 1, operative in accordance with an embodiment of the invention. In the method of FIG. 3, executable computer software instructions are provided to a client computer, where the instructions are configured as described hereinabove to obtain two sets of random numbers and associated timing information and report client evaluation information using this information (step 300). Seed candidates are identified using the client evaluation information (step 302), and candidate performance counter frequencies are determined from the seed candidates and the difference between when the sets of random numbers were obtained (step 304). If any of the candidate performance counter frequencies is consistent with a predefined performance counter frequency that is associated with virtual machines (step 306), then the client computer is identified as operating as a VM (step 308), whereupon a notification may be sent identifying the client computer as operating as a VM (step 310), and activities that involve the client computer may be subject to additional security measures, such as by subjecting the activities to further scrutiny, curtailing the activities, or preventing the activities from being completed. (step 312).

The system of FIG. 1 and method of FIG. 3 may be illustrated in the context of the following exemplary scenario in which:

client 104 is used to navigate to an online banking web site that is hosted by server 100;

server 100 provides web page 108 to the web browser at client 104, where web page 108 includes instructions 102 configured as described hereinabove;

the web browser at client 104 executes instructions 102, which obtains two sets of random numbers and records their timestamps;

the web browser at client 104 reports to client monitor 114 client evaluation information based on the two sets of random numbers and their timestamps;

client monitor 114 identifies seed candidates and candidate performance counter frequencies from the client evaluation information;

VM detector 116 determines that at least one of the candidate performance counter frequencies is consistent with predefined performance counter frequency that is associated with virtual machines, and therefore determines that client 104 is operating as a VM;

VM detector 116 notifies server 100 that client 104 is operating as a VM; and server 100 flags the financial transaction involving client 104 as suspicious.

Figure 4:
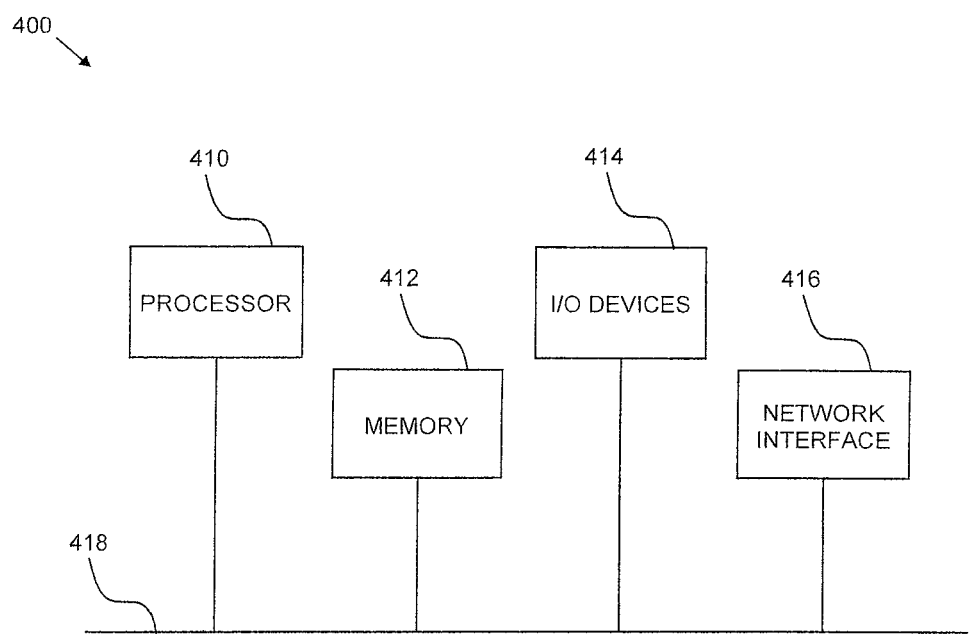
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting the operation of a virtual machine, the method comprising:
   identifying a plurality of seed candidates from each of two or more sets of random numbers generated at a computer, wherein each of the sets includes a plurality of random numbers and each of the sets of random numbers is produced at a different time;
   identifying a plurality of candidate performance counter frequencies from the plurality of seed candidates and from timing information associated with the two or more sets of random numbers; and
   determining that the computer is operating as a virtual machine if any of the candidate performance counter frequencies is consistent with a predefined virtual machine performance counter frequency.

2. The method of claim 1 and further comprising obtaining the two or more sets of random numbers and the timing information from the computer.

3. The method of claim 1 and further comprising providing executable computer software instructions to the computer, wherein the executable computer software instructions are configured to
   obtain the two or more sets of random numbers and the timing information, and
   report the two or more sets of random numbers and the timing information.

4. The method of claim 3 wherein the providing comprises providing the executable computer software instructions within a web page.

5. The method of claim 3, wherein the instructions to obtain the two or more sets of random numbers and the timing information comprise instructions to execute two or more separate instances of a multimedia rendering engine configured to generate a plurality of random numbers.

6. The method of claim 5, further comprising instructions to
   record a timestamp associated with each set of random numbers, and
   calculate a difference between the timestamps associated with two sets of random numbers.

7. The method of claim 6, wherein identifying a plurality of candidate performance counter frequencies comprises calculating the difference modulo 32 between two seed candidates corresponding to two sets of random numbers, and
   dividing the difference modulo 32 between the two seed candidates by the difference in the timestamps associated with the two sets of random numbers to provide a candidate performance counter frequency.

8. A system for detecting the operation of a virtual machine, the system comprising:
   a client monitor configured to
      identify a plurality of seed candidates from each of two or more sets of random numbers generated at a computer, wherein each of the sets includes a plurality of random numbers and each of the sets of random numbers is produced at a different time, and
      identify a plurality of candidate performance counter frequencies from the plurality of seed candidates and from timing information associated with the two or more sets of random numbers; and
   a virtual machine detector configured to determine that the computer is operating as a virtual machine if any of the candidate performance counter frequencies is consistent with a predefined virtual machine performance counter frequency.

9. The system of claim 8 wherein the virtual machine detector is configured to provide a notification identifying the computer as operating as a virtual machine.

10. The system of claim 8 wherein the computer is configured with executable computer software instructions that are configured to
    obtain the two or more sets of random numbers and the timing information from the computer, and
    report the two or more sets of random numbers and the timing information.

11. The system of claim 10 wherein the executable computer software instructions are provided to the computer within a web page.

12. The system of claim 10, wherein the instructions to obtain the two or more sets of random numbers and the timing information comprise instructions to execute two or more separate instances of a multimedia rendering engine configured to generate a plurality of random numbers.

13. The system of claim 12, further comprising instructions to record a timestamp associated with each set of random numbers, and calculate a difference between the timestamps associated with two sets of random numbers.

14. The system of claim 13, wherein the instructions to identify a plurality of candidate performance counter frequencies comprise instructions to calculate the difference modulo 32 between two seed candidates corresponding to two sets of random numbers, and divide the difference modulo 32 between the two seed candidates by the difference in the timestamps associated with the two sets of random numbers to provide a candidate performance counter frequency.

15. The system of claim 12, further comprising instructions to record a timestamp associated with each set of random numbers, and calculate a difference between the timestamps associated with two sets of random numbers.

16. The system of claim 15, wherein the instructions to identify a plurality of candidate performance counter frequencies comprise instructions to calculate the difference modulo 32 between two seed candidates corresponding to two sets of random numbers, and divide the difference modulo 32 between the two seed candidates by the difference in the timestamps associated with the two sets of random numbers to provide a candidate performance counter frequency.

17. A computer program product for detecting the operation of a virtual machine, the computer program product comprising:

a non-transitory, computer-readable storage medium; and computer-readable program code embodied in the storage medium, wherein the computer-readable program code is configured to identify a plurality of seed candidates from each of two or more sets of random numbers generated at a computer, wherein each of the sets includes a plurality of random numbers and each of the sets of random numbers is produced at a different time, identify a plurality of candidate performance counter frequencies from the plurality of seed candidates and from timing information associated with the two or more sets of random numbers, and determine that the computer is operating as a virtual machine if any of the candidate performance counter frequencies is consistent with a predefined virtual machine performance counter frequency.

18. The computer program product of claim 17 wherein the computer is configured with executable computer software instructions that are configured to obtain the two or more sets of random numbers and the timing information, and report the two or more sets of random numbers and the timing information.

19. The computer program product of claim 18 wherein the executable computer software instructions are provided to the computer within a web page.

20. The computer program product of claim 18, wherein the instructions to obtain the two or more sets of random numbers and the timing information comprise instructions to execute two or more separate instances of a multimedia rendering engine configured to generate a plurality of random numbers.

* * * * *